United States Patent
Helmers et al.

[15] 3,664,480
[45] May 23, 1972

[54] APPARATUS FOR BRAKING A TABULATING CARRIAGE MOVEMENT

[72] Inventors: Helmut Helmers, Wilhelmshv.; Georg Werner, Heidmuehle; Albert Rix, Wilhelmshv, all of Germany

[73] Assignee: Olympia Werka AG, Wilhelmshaven, Germany

[22] Filed: Nov. 20, 1969

[21] Appl. No.: 878,372

[30] Foreign Application Priority Data

Nov. 29, 1968 Germany ................ P 18 11 758.3

[52] U.S. Cl. ............................................. 197/64
[51] Int. Cl. ......................................... B41j 19/02
[58] Field of Search ............................ 197/64, 183

[56] References Cited

UNITED STATES PATENTS

| | | |
|---|---|---|
| 606,940 | 7/1898 | Price ............................ 197/64 X |
| 1,005,781 | 10/1911 | Raber ............................ 197/64 |
| 1,451,277 | 4/1923 | Stickney ........................ 197/64 |
| 1,506,787 | 9/1924 | Stickney ........................ 197/64 |
| 2,129,650 | 9/1938 | Crumrine ...................... 197/64 |
| 2,784,829 | 3/1957 | Kupper ......................... 197/64 |
| 2,829,754 | 4/1958 | Norcross ....................... 197/64 |

*Primary Examiner*—Ernest T. Wright, Jr.
*Attorney*—Michael S. Striker

[57] ABSTRACT

The drive member of a spring motor, which is connected with a typewriter carriage for moving the same in a writing and tabulating direction, is mounted for rotation about the same axis as a centrifugal brake means which is surrounded by an annular brake member integral with the drive member and connected by a reversing transmission and a one-way coupling with the brake means so that during tabulating the brake means and the brake member rotate in opposite directions and the carriage movement is braked.

10 Claims, 3 Drawing Figures

INVENTOR
HELMUT HELMERS
GEORG WENNER
ALBERT RIX
BY [signature]
ATTORNEY

APPARATUS FOR BRAKING A TABULATING CARRIAGE MOVEMENT

BACKGROUND OF THE INVENTION

It is known to provide typewriters with a brake device which is effective during the tabulating movement of the carriage. In order to obtain a uniform carriage speed, centrifugal brakes are used, which permit the start of the carriage movement at a high speed, and have a braking effect on the carriage which is gradually increased with the increased speed. In accordance with the prior art, the brake device has a drive pinion which meshes with an outer gear on the rotary casing of the spring motor by which the carriage is driven. The spring motor and the braking device are two separate and distinct units, which are connected by gears to each other. The braking device has rotary brake means driven from the spring motor, and cooperating with a stationary annular brake member surrounding the brake means and forming a casing.

SUMMARY OF THE INVENTION

It is one object of the invention to provide a typewriter with a braking device which takes up very little space, is of simple construction, requires little service and adjustment, and forms a compact unit with the drive motor.

Another object of the invention is to combine the rotary drive member of the spring motor with an annular brake member in one integral body.

Another object of the invention is to provide a reversing transmission between the rotary drive member and one element of a one-way coupling whose second coupling element is connected with the brake means so that the brake means and the annular brake member rotate in opposite directions whereby the braking effect is increased.

Another object of the invention is to provide a braking apparatus in which the drive member, the brake means, and a one-way coupling are all mounted for rotation about a common axis.

With these objects in view, one embodiment of the invention comprises a motor including rotary drive means connected with a typewriter carriage so that the same moves in a writing and tabulating direction during rotation of the drive means in one direction; a centrifugal brake device including a rotary brake means and an annular brake member surrounding the same; supporting means, such as a shaft, mounting the drive means and the brake means for rotation about a common axis; and one-way coupling means connecting the drive means with the brake means for rotation in said one direction only so that the brake means is rotated by the drive means and the brake device is actuated only during the tabulating movement of the carriage.

Preferably, the rotary drive means includes a rotary drive member integral with the annular brake member and forming a casing with the same.

Due to the construction of the invention, a single casing and a single shaft can be used as compared with devices of the prior art where two casings and two shafts are required, so that the apparatus of the invention is more compact.

In the preferred embodiment of the invention, a reversing transmission connects the annular brake member and the drive member with the brake means so that the frictionally engaged parts of the brake move in opposite directions and at a very high relative speed whereby the brake effect is improved.

Preferably, the reversing transmission includes an inner gear forming with the drive member and the annular brake member an integral body. The transmission further includes an intermediate gear mounted on a stationary shaft, and a pinion forming one coupling element of the one-way coupling whose other coupling element is connected with the rotary centrifugal brake means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
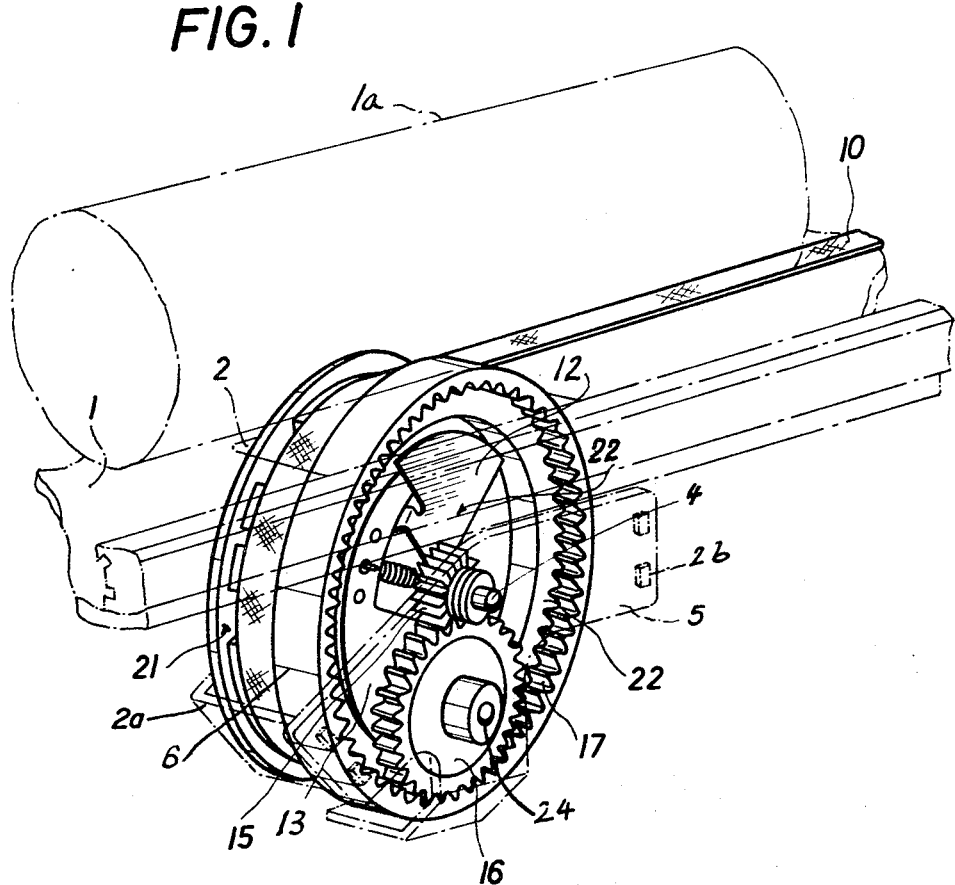
FIG. 1 is a fragmentary perspective view illustrating an apparatus according to the invention.
Figure 3:
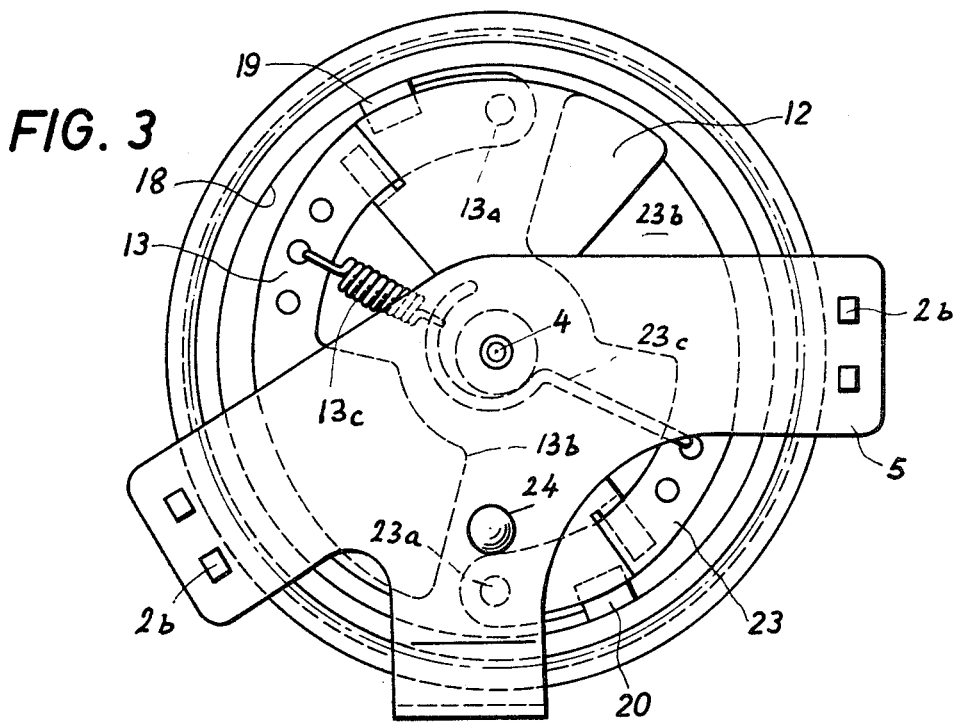
FIG. 3 is a front view of the apparatus.
Figure 2:
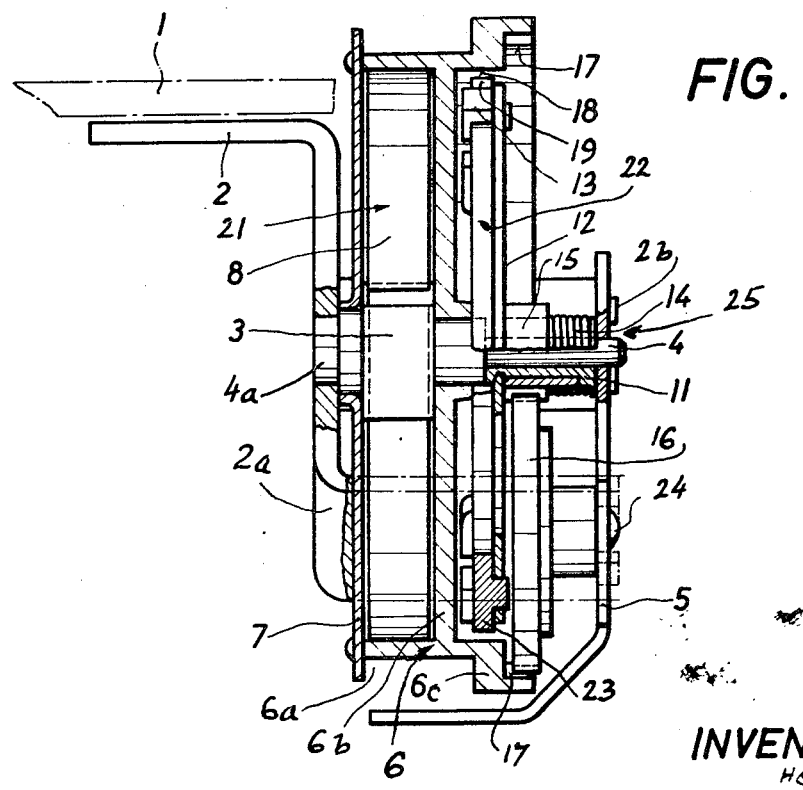
FIG. 2 is an axial sectional view of the apparatus.

A supporting bracket 2 is secured to the carriage bed 1 on which the paper carriage, not shown, of a typewriter is mounted for writing and tabulating movement in one direction, and for return movement in the opposite direction. The carriage includes a cylindrical platen 1a.

The apparatus includes a spring motor 21 and a brake part 22 mounted on the supporting bracket 2 for rotation about a common axis defined by a shaft 4 whose thicker portion 4a is mounted in support bracket 2, while its thinner portion is mounted on a support member 5 which is connected with support bracket 2 by two arms 2a having connecting portions 2b.

The annular core 3 of spring motor 21 is mounted on shaft portion 4a surrounding the same, and is secured to support bracket 2. A spiral spring 8 has an inner end secured to core 3 and an outer end secured to an annular member 6 which, together with the lateral disc 7, forms a casing. As best seen in FIG. 1, a band 10 is wound about a recessed portion 6a of casing 6, and has a free end secured to the carriage, not shown. When the carriage, not shown, is returned, spring 8 of the spring motor 21 is wound up, and when the escapement mechanism, not shown, of the typewriter is released, the band 10 is wound up on casing 6 so that the carriage, not shown, is moved in a writing and tabulating direction by the casing 6 which constitutes a drive member which is rotatably supported by disc 7 and wall 6b on portion 4a of shaft 4 for rotation about the axis of shaft 4.

An integral part 6c of casing 6 has an inner circular brake surface 18, and constitutes an annular brake member surrounding centrifugal brake means which include carrier arms 12 and brake arms 13 and 23 mounted on pivots 13a and 23a on the carrier arms 12 for angular movement, and being urged by weight portions 13b and 23b in outward direction until brake linings 19 and 20 abut the inner annular brake surface 18 in frictional engagement. A transverse spring 13c is hooked into brake arm 13 and connected with a hook 23c secured to brake arm 23 so that brake arms 13 and 23 are normally biassed to assume a retracted position in which brake linings 19 and 20 do not engage brake surface 18. However, when brake means 12, 13, 23 rotates at high speed during a tabulating movement, as will be explained hereinafter, brake arms 13 and 23 move outward, and brake linings 19 and 20 engage brake surface 18.

The thin portion of shaft 4 supports a one-way coupling of known construction, which includes a coupling element in the form of a sleeve 11 which is freely rotatable on shaft 4 and surrounded by a coil spring 14 one end of which is secured to sleeve 11. The carrier arms 12 of the brake means are secured to the other end of sleeve 11 which also rotatably supports a pinion 15 which constitutes the other coupling element of a one-way coupling 25, and is secured to the other end of coil spring 14.

As best seen in FIG. 1, pinion 15 meshes with an intermediate gear 16 mounted on a shaft 24 supported by support member 5, and meshing with an inner gear 17 forming another integral circular portion of casing 6.

The transmission 17, 16, 15 reverses the direction of rotation so that pinion 15 rotates in a direction opposite to the direction of casing 6 which constitutes the drive member by which the carriage is driven.

When drive member 6 rotates in counterclockwise direction as viewed in FIG. 1 and pulls the carriage through band 10 in the writing and tabuling direction, pinion 15 is rotated by the transmission gears 17 and 16 to turn in the opposite direction whereby the coil spring 14 is tensioned and tightly engages sleeve 11 so that coupling elements 15 and 11 are connected with each other, and since the brake carrier 12 is secured to sleeve 11, the same is also rotated in a direction opposite to the direction of rotation of the inner circular brake surface 18 of drive member or casing 6.

When the spring motor 21 is wound up by moving the carriage to the right as viewed in FIG. 1, drive member 6 turns in clockwise direction, and pinion 15 is turned in the opposite direction so that coil spring 14 of the one-way coupling 25 is spread and the driving connection between the coupling elements 15 and 11 is interrupted so that brake carrier 12 stops together with brake arms 13 and 23, and the brake is inoperative.

After the spring motor 21 and its spring 8 have been wound up by returning the carriage, not shown, release of the escapement mechanism by operation of a key or by operation of the tabulating key permits movement of the carriage in the writing direction. While upon release of an actuated key, the escapement mechanism, not shown, immediately stops the carriage, actuation by the tabulating key causes a continuous movement of the carriage so that the speed of the drive member 6 and of the carriage gradually increases, and the rotation of drive member 6 is transmitted by the transmission 17, 16, 15 and coupling spring 14 to sleeve 11 which is tightly engaged by spring 14, and transmits rotary motion to the brake means 12, 13, 23 so that the brake arms 13 and 23 are moved outwardly by the centrifugal force and the brake linings 19 and 20 engage the inner brake surface 18 which rotates in the opposite direction whereby a very strong braking effect is obtained. Due to the fact that the inner gear 17 has a greater diameter than gear 16 and pinion 15, the speed of the brake means 12, 13, 23 is greater than the speed of the drive member 6 and of its brake surface 18 on portion 6c.

The strong braking effect of the oppositely rotating brake surface 18 and brake linings 19 and 20 is due to the fact that the ratio of the transmission 17, 16, 15 increases the brake distance so that brake linings 19 and 20 travel a longer way while the carriage moves with drive member 6 a shorter distance.

It will be understood that each of the elements described above, or two or more together, may also find a useful application in other types of apparatus for braking a carriage movement differing from the types described above.

While the invention has been illustrated and described as embodied in a combined spring motor drive and centrifugal braking device for the paper carriage of a typewriter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention.

What is claimed as new and desired to be protected by Letters Patent is set forth in the appended claims.

We claim:

1. Apparatus for braking a tabulating movement, comprising, in combination, drive means including a rotary annular drive member, means for connecting said drive member with a carriage for moving the carriage in a writing and tabulating direction during rotation of said drive member in one direction, and a transmission means driven from said drive member; a brake device including an annular brake member having an inner annular brake surface and having substantially the same diameter as said annular drive member, said annular drive member being integral with said annular brake member and forming a casing with said annular brake member, and rotary centrifugal brake means in said casing frictionally engaging said inner annular brake surface when rotating at a predetermined speed; supporting means mounting said casing and said brake means for rotation about a common axis; spring means in said casing having one end connected to said casing and the other end connected with said supporting means and being biassed during rotation of said drive member in the direction opposite to said one direction; and one-way coupling means having an engaged position for connecting said brake means with said transmission means, and moving to said engaged position when rotated by said transmission means whereby said brake means is rotated at said predetermined speed and frictionally engages said inner annular brake surface for braking said drive member.

2. Apparatus as claimed in claim 1 wherein said transmission means is a reversing transmission means so that said brake means and said brake member rotate in opposite directions during rotation of said drive member in said one direction when said one-way coupling means is in said engaged position.

3. Apparatus as claimed in claim 1, wherein said transmission means includes an inner gear integral with said casing, and a pinion connected with said one-way coupling means.

4. Apparatus as claimed in claim 1 wherein said one-way coupling means includes a first rotary coupling element connected with said transmission means for rotation, and a second rotary coupling element connected with said brake means for rotation; and wherein said supporting means mount said first and second rotary coupling elements for rotation about said common axis.

5. Apparatus as claimed in claim 4 wherein said supporting means include a shaft having said common axis; wherein said second rotary coupling element includes a sleeve mounted on said shaft for rotation; and wherein said one-way coupling means includes a coil spring surrounding said sleeve and having one end secured to said sleeve and the other end secured to said first rotary coupling element so that said coil spring is tightened about said sleeve during rotation of said drive member in said one direction.

6. Apparatus for braking a tabulating carriage movement, comprising, in combination, a motor including rotary drive means including a drive member, and means for connecting said drive member with a carriage for moving the carriage in a writing and tabulating direction during rotation of said drive member in one direction; a brake device including centrifugal rotary brake means; supporting means mounting said drive means and said brake means for rotation about a common axis; one-way coupling means connecting said drive means with said brake means for rotation when said drive member is rotated in said one direction only so that said brake means is rotated by said drive means and said brake device is actuated only during tabulating movement of the carriage; said drive means including a transmission including an inner gear connected with said drive member for rotation about said common axis, an intermediate gear meshing with said inner gear, and a pinion supported by said supporting means for rotation about said common axis and being connected with said one-way coupling means.

7. Apparatus as claimed in claim 6 wherein said drive member and said inner gear form an integral body.

8. Apparatus as claimed in claim 7 wherein said brake device includes an annular brake member surrounding said brake means and having an inner annular brake surface cooperating with said brake means; and wherein said annular brake member is an integral part of said integral body.

9. Apparatus as claimed in claim 6 wherein said brake device includes an annular brake member surrounding said brake means and having an inner annular brake surface frictionally engaged by said brake means; and wherein said annular brake member is concentric with said common axis and secured to said inner gear for rotation therewith so that said annular brake member and said brake means rotate in opposite directions.

10. Apparatus as claimed in claim 6 wherein said one-way coupling means includes a first coupling element mounted for rotation about said common axis and secured to said brake means for rotation therewith, and a second coupling element concentric with said common axis; wherein said brake device includes an annular brake member connected with said drive member for rotation about said common axis and having an inner annular brake surface frictionally engaged by said brake means when said brake means is actuated; and wherein said transmission means connects said drive member with said second coupling element so that said brake means and said brake member rotate in opposite directions during rotation of said drive member in said one direction when said first and second coupling elements are coupled.

* * * * *